Feb. 28, 1956   L. J. ZERBEE   2,736,093
FIX FINDER

Filed Sept. 8, 1951   2 Sheets-Sheet 1

INVENTOR.
Louis J. Zerbee
BY Dybvig & Dybvig
His Attorneys

Feb. 28, 1956 L. J. ZERBEE 2,736,093
FIX FINDER
Filed Sept. 8, 1951 2 Sheets-Sheet 2
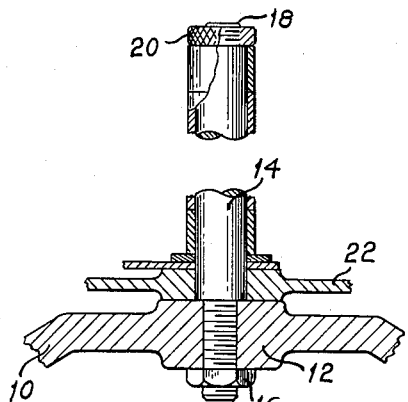
Fig. 5
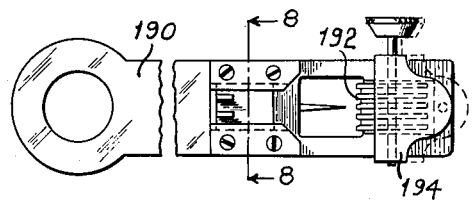
Fig. 6
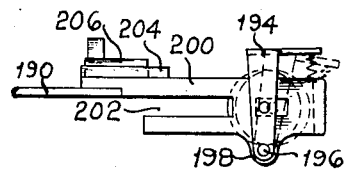
Fig. 7
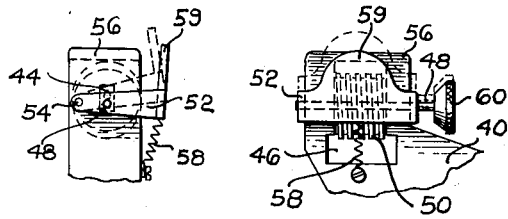
Fig. 10  Fig. 11
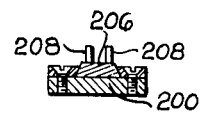
Fig. 8
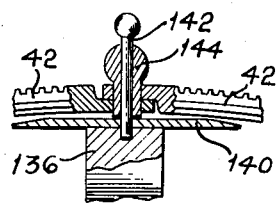
Fig. 9
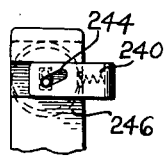 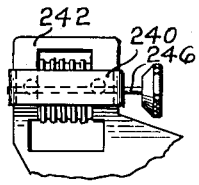
Fig. 12  Fig. 13
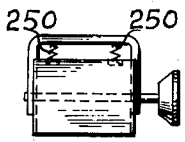
Fig. 14
INVENTOR.
BY *Louis J. Zerbee*
*Dybvig & Dybvig*
*His Attorneys*

United States Patent Office 2,736,093
Patented Feb. 28, 1956

2,736,093
FIX FINDER
Louis J. Zerbee, Bellefontaine, Ohio

Application September 8, 1951, Serial No. 245,740

5 Claims. (Cl. 33—1)

This invention relates to an improvement in a navigation instrument and more particularly to an improvement in a fix finder for use in celestial navigation.

Celestial navigation is based upon sextant or octant observations of celestial bodies which will be referred to hereinafter as stars. Furthermore, in most parts of the world the observations are based upon correct Greenwich time and data obtained from the American Nautical Almanac compiled by the United States Naval Observatory.

The information obtained from the sextant, the chronometer and the almanac is used in constructing spherical triangles on the face of the earth. By the solution of the spherical triangles, it is possible to designate or find the position of the person making the observation with the sextant.

From the American Nautical Almanac one may determine the sub-stellar spot, that is, the exact point at which a line drawn from the center of the earth to a predetermined star intersects the surface of the earth. The point is generally identified by Greenwich hour angle and declination. By means of a sextant, it is possible to determine the angular distance of a sub-stellar spot from the position of the observer, that is, one side of a spherical triangle.

As is well known to those skilled in the art, the solution of spherical triangles is a long and tedious operation. Consequently, through the course of many years, various short-cuts or approximations have been devised by scientists, astronomers and navigators, to simplify the solution of a spherical triangle or the finding of a "fix." The method now generally used consists of voluminous tables of solutions of parts of, complete and combinations of spherical triangles, together with a Mercator's chart upon which is plotted the calculations that are obtained from the tables and the sextant observation. Even with these short-cuts, the time required by the best navigators is very often more than thirty minutes. The possibility of error is great, for the reason that in leafing through the voluminous tables, one is very apt to select the wrong figures or make error in recording such figures, resulting, of course, in an incorrect answer or "fix." The term "fix," as used in navigation, is a point where two definite lines cross, illustrative of which is where meridians of longitude and parallels of latitude cross.

This is an improvement upon the fix finder disclosed in my Patent No. 2,519,532 patented August 22, 1950, for Fix Finder.

An object of this invention is to provide a fix finder that may be readily adjusted into position with great efficiency.

Another object of this invention is to provide a fix finder that may be used in finding the position of a navigator in a very short period of time after making the necessary observations.

Another object of this invention is to provide a fix finder that in addition to readily indicating the location of a navigator, may also be used to provide data for charting a route between two points along a great circle passing through two points, in other words, to provide data for charting a route along the shortest path between the two points.

Other objects and advantages reside in the construction of parts, the combination thereof and the mode of operation, as will become more apparent from the following description.

In the drawings,

Figure 5 is a fragmentary cross sectional view taken substantially through the center of the fix finder disclosed in Figure 1.

Figure 6 is another fragmentary detail view.

Figure 7 is a side elevational view of some of the parts shown in Figure 6.

Figure 8 is a cross sectional view taken substantially on the line 8—8 of Figure 6.

Figure 9 is a fragmentary cross sectional view of the locating mechanism.

Figures 10 and 11 are fragmentary side and front elevational views respectively of the adjusting mechanism for latitude adjustments.

Figure 12 is a side elevational view of a modification.

Figure 13 is a front elevational view of the modification disclosed in Figure 12.

Figure 14 is a top plan view thereof.

Figure 1:
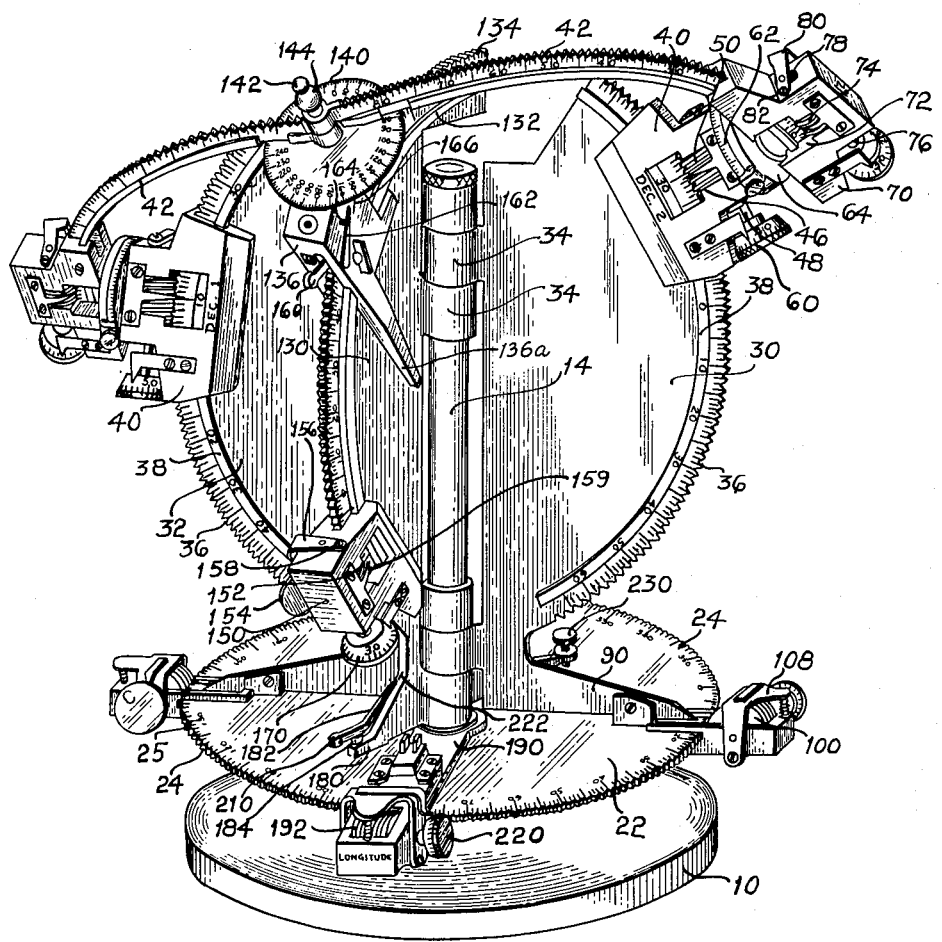
Figure 1 is a perspective view of the preferred embodiment of the fix finder.

Referring to the drawings, the reference character 10 indicates the base of the instrument. This base is provided with a raised central portion 12 supporting an upright cylindrical standard 14 threadedly engaging the base and locked in position by a lock nut 16. The standard 14 projecting above the base is cylindrical and terminates in a threaded portion 18 having threaded thereon a retaining nut 20.

Directly above the base and supported upon the standard 14 is a disc 22 provided with marginal gear teeth 24 disposed at 1° intervals. Suitable graduations 25 register with the teeth and are provided with indicia reading from 0 to 360°. A second set of indicia (not shown) may be used, consisting of two halves, each reading from 0 to 180°.

By referring to the American Nautical Almanac, the sub-stellar spot of a star is determined for a particular time. As described in the aforementioned patent, Greenwich hour angle vanes, hereinafter referred to as G. H. A. vanes, are adjusted into positions corresponding with the meridians of the sub-stellar spots of stars. A pair of G. H. A. vanes 30 and 32 are pivotally mounted upon the standard 14. Each of these vanes is provided with a pair of centrally disposed loops 34 having an internal bearing surface snugly seated upon the standard 14. The tolerance between the standard 14 and the bearing surface is small, so as to reduce the play to a minimum. Each vane is provided with external gear teeth 36, spaced 1° apart. A pair of guides 38 for each of the vanes is provided with indicia registering with graduations extending from the teeth 36. The indicia are measured from a zero point corresponding to the earth's equator and are marked in degrees towards each pole.

A pair of carriages 40, one for each of the vanes 30 and 32, is used in supporting quadrants 42 by means of a mechanism which will now be described. Each carriage 40 is provided with an arcuate groove that is snugly seated upon the guide members 38, there being one pair of guide members for each vane, in that there is a guide member on each side of the vane. Each carriage 40 is provided with a pair of transversely disposed slots 44, one on either side of an opening 46, as best seen in Figures 10 and 11. A shaft 48 supporting a worm gear 50 projects through the slots 44 and is journalled in suitable apertures in a U-shaped member 52, pivotally mounted upon pintles 54 fixedly mounted in a projection 56 of the carriage 40. A suitable spring 58 is used in biasing the bight of the U-shaped member 52 downwardly, as disclosed in Figures 10 and 11. A thumb grip 59 is integral with the bight of the U-shaped member 52 and actuates the worm gear 50 out of contact with the teeth 36 when the thumb grip 59 is depressed from the full line position shown in Figures 10 and 11 into the dot-dash position. This permits rapid adjustment of the carriage 40 with respect to the periphery of the vane 30 or 32, as the case may be. As soon as the carriage has been adjusted into the approximate position of the sub-stellar spot, the accurate adjustment is made by rotating the knurled hand grip wheel 60 after releasing the thumb grip 59, so as to permit the gear 50 to engage the gear teeth in the margin of the particular vane supporting the carriage. The worm gear 50 meshes with the gear teeth 36. The knurled wheel 60 is keyed to the shaft 48 and is used for rotating the worm gear 50.

Each carriage 40 is provided with a graduated disc-like portion 62 rotatably supporting a disc-like portion 64, the disc-like portion 64 being provided with a downwardly directed apertured ear 66 provided with threads supporting a set screw 68 adapted for locking the disc-like portions 62 and 64 in non-rotative relation with respect to each other. Portion 62 is fixedly attached to the carriage 40. The portion 64 supports a housing-like member 70 provided with a transversely disposed opening 72 having mounted therein a worm 74 fixedly attached to a shaft 76 projecting through the slots 78 and pivotally mounted in the legs of a U-shaped member 80 pivotally mounted upon pintles 82 fixedly mounted in the housing 70. The U-shaped members 80 are substantially identical to the U-shaped member 52 and are each provided with a thumb grip (not shown), so that as this thumb grip is depressed, the worm gear is moved out of contact with the teeth of the quadrant 42 extending through an arcuate slot in the housing 70. The quadrant 42 is always located in a plane extending through the common center of all the arcuate margins of the vanes. Furthermore, the radius of curvature of the quadrant 42 intersects and terminates at said common center, so that the quadrant always forms the arc of a great circle. The axis of rotation of the housing 70 upon member 62 is radial with the G. H. A. vane 30.

Figure 2:
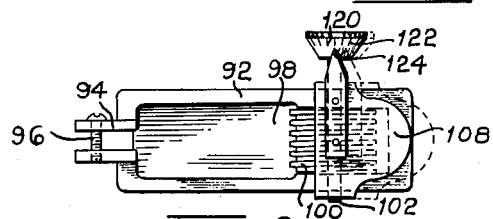
Figure 2 is a detail top plan view of the actuator and indicant for a Greenwich hour angle vane.
Figure 3:
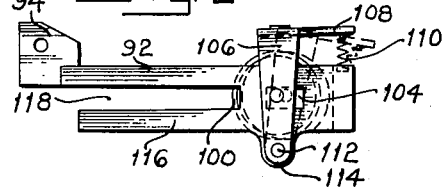
Figure 3 is a side elevational view of the actuator and indicant shown in Figure 2.
Figure 4:
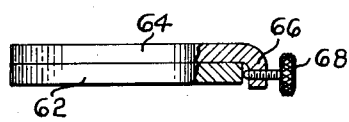
Figure 4 is a fragmentary detail view shown partly in section and having the graduations omitted.

Each of the G. H. A. vanes 30 and 32 is provided with a coplanar arm 90 integral with the vane, but located below the arcuate portion thereof and disposed radially of disc 22. Each arm 90 supports a bracket 92 attached to the arm by means of furcations 94 and a screw 96. The bracket 92 is provided with an opening 98 in which is mounted a worm gear 100 supported upon a shaft 102 projecting through oppositely disposed slots 104 and rotatably mounted in apertures in the legs of a U-shaped member 106 provided with a thumb grip 108 overlying a compression spring 110. The legs of the U-shaped member 106 are pivotally mounted upon pintles 112, each fixedly secured into downwardly projecting ears 114. The bracket 92 is provided with a radially disposed arm 116 extending parallel to the main body portion of bracket 92, but in spaced relation therefrom, so that the arm 116 cooperates with the main body of the bracket 92 to form a slot 118 receiving the disc 22. The worm gear 100 meshes with the gear teeth 24 when in the full line position, as shown in Figures 1, 2 and 3. By depressing the thumb grip 108 from the full line position into the dotted line position, the teeth of the worm gear 100 are actuated out of engagement with the teeth 24, so as to permit easy and rapid adjustment of the meridian vane 30 or 32, as the case may be. After the meridian vane 30 or 32 has been adjusted into the approximately desired position, the thumb grip 108 is released, the compression spring 110 actuating the worm gear 100 into engagement with the gear teeth 24, which permits micrometer adjustment of the meridian vane by means of a knurled head 120 provided with graduations 122 adapted to register with an indicant 124. There are preferably 60 graduations 122, so that each graduation represents one minute of arc.

A meridian vane 130 is also pivotally mounted upon the standard 14. This vane 130 is provided with a pair of guides 132 similar to the guides 38, but longer, in that the vane 130 is provided with an arcuate extension 134 extending beyond or over the top of the standard 14. This extension permits fix finding in the polar regions. The quadrant is free to swing through more than 360° and without any interference in the polar region for any position of the vanes 30 or 32. A carriage 136 is mounted on the vane 130 and is guided by the guides 132.

The carriage or fixture 136 has fixedly attached thereto a dial 140 graduated in degrees. The arm 136a is used to stabilize the fixture 136 by engaging the side of the vane 130. In the center of the dial there is an aperture, as best seen in Figure 9, for receiving an aligning pin 142 extending through an aperture in a tubular member 144, which tubular member is used in aligning apertures in the ends of the quadrants 42. The tubular member 144 rests in close proximity to the dial 140. The movement of the tubular member 144 is limited, in that the tubular member has a tapered hole and stops short of ever reaching dial 140. Furthermore, in the event the taper of the tubular member 144, in cooperation with the tapered holes, does not arrest the movement of the tubular member 144, the head portion of the tubular member 144 might be referred to as a duo-functional portion, in that it would then limit the movement of the tubular member in the apertures in the quadrants 42 and also provide a hand grip for the removal of the tubular member, together with the pin 142 from the assembly, as will appear more fully later.

An indicating mechanism 150 is also slidably mounted upon the guides 132. This indicating mechanism may be actuated into contact with an arm 160 to indicate the position of the carriage, as will be described more fully hereinafter. This indicating mechanism 150 includes a worm 152 engaging the gear teeth of the meridian vane 130. This worm may be actuated out of engagement with the gear teeth by means of the finger grip 154 integral with the U-shaped member 156 pivotally mounted at 158 to the frame of the indicating mechanism 150. By engaging the finger grip 154, it is possible to raise the indicating mechanism into contact with the arm 160 pivotally mounted in the carriage 136 and attached to a pivotally mounted indicant 162 located on the side of the carriage. Either the weight of the arm 160 or suitable spring tension causes the indicant 162 to normally be seated against a pin 164 located on the side of the carriage 136. When the indicating mechanism 150 is raised into engagement with the arm 160 without actuating the carriage 136, and then raised slightly, it will cause the indicant 162 to be rotated in a clockwise direction, as viewed in Figure 1, until the indicant 162 registers with an index 166 engraved into the side of the carriage 136. When the indicating mechanism 150 has been adjusted into this position, the degrees may be read through the window of the indicating mechanism 150 and the minutes may be read upon the knurled head 170 graduated in minutes. The meridian vane 130 is provided with a radially disposed arm 180 located below the vane, but integral therewith. This arm 180 is provided with an indicant 182 pivotally mounted at 184 to the arm 180.

A bracket member 190, shown in detail in Figures 6 and 7, supports a worm gear 192 mounted in the U-shaped member 194 pivotally attached at 196 to the downwardly projecting ears 198 of the bracket member 200 fixedly attached to bracket member 190. This bracket member 200 is provided with a slot 202 straddling the margin of the disc 22. The upper surface of bracket member 200 is provided with a pair of guides 204 cooperating to form a dovetail slot in which is mounted a dovetail guide member 206 provided with a pair of upwardly directed prongs 208, as best seen in Figure 8. The dovetail guide member 206 is mounted for reciprocatory movement in the dovetail slot formed by guide members 204, so that dovetail member 206 may be actuated radially from "out" position to "in" position and vice versa. When the dovetail member 206 is in the "out" position, it clears the enlarged head 210 of the indicant 182. By adjusting the bracket member 200 so as to substantially align it with the arm 180, the head 210 of the indicant 182 may be aligned with the slot formed between the two prongs 208. When the head 210 is aligned with the slot formed between the two prongs 208, the dovetail member 206 may be actuated into "in" position, so that the prongs 208 are located on opposite sides of the head member 210. The distance between the two prongs 208 is substantially equal to the diameter of the head member 210. By the prongs 208 being located on opposite sides of the head member 210, it can readily be seen that by actuating the knurled head 220 actuating the worm gear 192, the indicant 182 may be adjusted so as to be aligned with the index 222 engraved into the face of the arm member 180. When the indicant 182 registers with the indicia 222, the reading of the position of the meridian vane may be made by reading the degrees from the disc 22 and the minutes on the knurled head 220.

In view of the fact that the G. H. A. vanes 30 and 32 and the meridian vane 130 are supported solely upon the standard 14 projecting upwardly from the base, the G. H. A. vanes and the meridian vane are free to rotate through 360° without obstruction from the supporting mechanism. Furthermore, the standard terminating below the extension 134 of the meridian vane 130, permits finding the fix in the polar regions. The location of the fix in the polar regions may be determined as accurately as in any other region on the surface of the earth. For most accurate results, the directions of the two sub-stellar spots from the point of observation are substantially at right angles to each other.

Due to the fact that the meridian vane 130, as well as the G. H. A. vanes 30 and 32 are mounted upon the standard 14 which functions as a sole support for these vanes, it can readily be seen that the vane 130 may be located between the acute dihedral angle formed by the vanes 30 and 32 as shown in Figure 1, or the meridian vane 130 may be located between the obtuse dihedral angle formed by the vanes 30 and 32, so that the meridian vane 130 may be located either to the left or to the right of the G. H. A. vanes 30 and 32. This has been made possible by the use of a standard without obstructions preventing the free rotation of the three vanes. The vane 130 is provided with an arm diametrically disposed with respect to the slot between the two prongs 208. This arm is provided with a set screw 230, used in locking the vane 130 in a stationary position.

*Mode of operation*

The navigation instrument described above has a duo-functional purpose, in that it may be used as a fix finder and may also be used as a device for providing data for charting a course along a great circle between two points. The device when used for providing data for charting a course, may also be used to determine whether or not the course is being followed by the navigator.

When the device is used as a fix finder, the navigator may first decide at what time he desires to make the readings. He also decides upon two known stars that are listed in the American Nautical Almanac to ascertain the location of the sub-stellar spots of the two selected stars at the particular time he has decided to make the observations. He then adjusts the G. H. A. vane 30 to the Greenwich hour angle designated by the American Nautical Almanac for one of the stars. After this has been done, he adjusts the carriage 40 to the desired declination. The set screw 68 is loosened, so that the housing 70 is free to rotate with respect to the disc portion 62 and the carriage 40. In making these adjustments, the pin 142 and the tubular member 144 are first removed so that the ends of the quadrants 42 are detached. He then adjusts the G. H. A. vane 32 in like manner for the sub-stellar spot reading obtained from the American Nautical Almanac for the second selected star.

When the particular selected time arrives for taking the observation, sextant readings are taken so as to determine the angle of altitude above the horizon of the two selected stars at that particular time. The two quadrants 42 are then adjusted to the angles obtained from the sextant readings, that is, the quadrant mounted in association with the G. H. A. vane 30 is adjusted to the angle of altitude observed on the first star and the quadrant 42 in association with the G. H. A. vane 32 is adjusted to the sextant readings obtained from the observation of the second star. The ends of the quadrants 42 are then brought together and the apertures therein aligned in readiness to receive the tubular member 144. The ends may meet in one of two possible locations, in that the ends of the quadrants generate circles intersecting at two points, if proper selection of the stars has been made. The navigator from his dead reckoning can in all probability determine which point represents his location.

The meridian vane 130, upon the set screw 230 being first loosened, is adjusted so as to be substantially aligned with the aperture through the tubular member 144. The carriage 136 is then adjusted so as to cause the aperture through the dial 140 to register with the aperture through the tubular member 144 in readiness for the insertion of the pin 142. When the pin 142 has been projected through the aperture in the tubular member 144 and into the aperture in the dial 140, the center of the pin 142 designates the exact location of the point from which the observations were made.

The longitude is read by adjusting the bracket 200 into such a position that the dovetail guide member 206 causes the indicant 182 to be aligned with the indicia 222. When it has been so aligned, the degrees of longitude are read upon the disc 22 and the minutes are read upon the knurled head 220.

The latitude is obtained by raising the indicating mechanism 150 up towards the carriage 136, so as to cause the indicating mechanism 150 to actuate the arm 160 into a position such that the indicant 162 registers with the index 166. The degrees of latitude are then read upon the scale adjacent the margin of the meridian vane 130. The minutes are read on the graduated knob 170.

When the fix finder is used in determining the fix, as disclosed in Figure 1, two spherical triangles have been formed, one to the right of the meridian vane 130 and the other to the left thereof. The one to the right of the meridian vane 130 is bounded by an arc of a grea circle positioned in a plane coincident with the meridian vane 130, this arc extending from the longitudinal axis of the standard 14 to the axis of the pin 142. Another side of the spherical triangle is formed by an arc in a plane containing the periphery of the G. H. A. vane 30, the arc extending from the longitudinal axis of the standard 14 and terminating in the axis of rotation of the housing 70 upon the carriage 40 supported by the G. H. A. vane 30. The third side of this spherical triangle is an arc of a great circle positioned in a plane determined by the quadrant 42 mounted upon the G. H. A. vane 30 and extending from the axis of the pin 142 to the axis of rotation of the housing 70. The azimuth angle between the meridian vane 130 and that portion of the quadrant 42 referred to above is read upon the dial 140. The azimuth angle between that portion of the quadrant 42 described above and the arc corresponding to the portion of the periphery of the G. H. A. vane 30 is read upon the graduations in the margin of member 62.

The other spherical triangle is formed by the plane of the meridian vane 130, a second plane of the G. H. A. vane 32 and a third plane determined by the quadrant 42 carried by the G. H. A. vane 32. Thus, two spherical triangles have been formed (1) from the information derived from the sextant readings, (2) from information derived from the chronometer and American Nautical Almanac and (3) from movements of the various members of the instrument. The magnitude of each side and each angle is indicated on the instrument. The specific information required to establish a fix is the intercept of the meridian vane 130 between the center of the pin 142 and the zero graduation of the meridian vane 130. This arc represents the latitude of the observer, the whole degrees of which are read opposite the indicator 159 and the minutes on the knurled head 170. The other specific information required to establish a fix is the angular distance of the meridian vane 130 on which the above point is located from the prime meridian. This would be the longitude of the place. The longitude is indicated on the disc 22. Thus, we have the longitude and latitude of the observer or a fix.

The values of the other angles and sides of the spherical triangles are of great value in solving other problems of navigation and astronomy. These values may be determined by using the various indicators adjacent the azimuth angles. The meridian angles are read upon the graduated scale on the disc 22. The azimuth angles are read on the dial scales 140. The device may be used to solve additional spherical triangles by adding G. H. A. vanes and quadrants.

It is also desirable in navigation to chart a course from a starting point to a given destination. For example, starting from New York city and sailing or flying to London, the shortest distance is coincident with a great circle passing through the two points. The meridian vane 130 may be adjusted to the longitude of New York city and the set screw 230 tightened, so as to lock the meridian vane in this particular position. The carriage 136 may then be adjusted to the latitude of New York. These adjustments are made with the pin 142 and the tubular member 144 removed from the apertures in the ends of the quadrants 42. The G. H. A. vane 30 may then be adjusted to the longitude of London and the carriage 40 adjusted to the latitude of London. The quadrant 42 may then be adjusted so that the aperture through the end of the quadrant 42 associated with the G. H. A. vane 30 registers with the aperture in the dial 140, the tubular member 144 being first inserted into the aperture in this particular quadrant and then the pin 142. The quadrant associated with the other G. H. A. vane 32 is then disconnected from the tubular member 144 and the pin 142. The quadrant 42 associated with the G. H. A. vane 30 coincides with the great circle passing through the longitude and latitude of New York city and those of London. The navigator, in order to utilize the shortest route, then travels in the direction indicated by the quadrant 42.

From time to time he may desire to check his dead reckoning with his actual position. This may be done, beginning with vane 30, carriage 40, housing 70 and quadrant 42 in the above position, by tightening the set screw 68, so as to lock the angular position of the housing 70 with respect to the carriage 40, the carriage 40 remaining in a fixed position upon the G. H. A. vane 30 which remains in the same angular position throughout the course. In the event the log indicates that he has traveled 1200 miles from New York city, he then, by rotating shaft 76, adjusts the quadrant 42 through an angle of 20° towards the position of London, in that one nautical mile along a great circle represents 1°.

In the event two heavenly bodies are visible, he may then refer to the American Nautical Almanac and determine the sub-stellar spots for these two particular stars for a predetermined time. When the time arrives for taking the sextant readings, he will proceed to do so. He adjusts the vane 32 and the carriage thereon for the position indicated for one of the sub-stellar spots. He then actuates the associated quadrant 42 to represent the co-altitude of the star as obtained by the sextant and if it registers with the aperture in the associated quadrant used in indicating the course as adjusted to the dead reckoning position, he proceeds to re-set the vane 32 and the carriage mounted thereon to correspond with the second sub-stellar spot. He then actuates the quadrant to correspond with the co-altitude of the second star, as observed on the sextant and if the aperture in the quadrant again registers with the aperture in the quadrant indicating the dead reckoning position, he then knows that he is on the right course and his dead reckoning is correct. In the event he is in error, it will then be necessary to determine the fix by the two vanes 30 and 32, that is, releasing the vane 30 from its locked position and its quadrant 42, so as to ascertain the fix. After he has obtained the fix so as to definitely locate his position, he may then determine a new course to the point of destination by adjusting the vane 30 into the G. H. A. position and the latitude of his destination and adjusting the quadrant 42 supported upon the vane 30, so as to cause it to register with his actual position. From then on the navigator may follow the newly indicated course to his destination.

For surface navigation, especially navigation at sea, he may check his position with a fair degree of accuracy following the indicated course as follows. In the first place, in navigating at sea, both the log and the drift may be calculated quite accurately. That being the case, the chances are not very great that both the log and the drift would be in error. One or the other may be in error. Adjusting the quadrant 42 indicating the course along a great circle so as to cause the aperture in the end of the quadrant to correspond with the dead reckoning position, the navigator may then, in the event two celestial bodies are not available for observation, determine his position from a single body, as for example, the sun. This is accomplished by making two observations, one, when the heavenly body is aligned with the course and the other when the heavenly body is at right angles to the course. In sailing from New York to London, the general direction is eastwardly. The co-altitude of the sun is determined by means of a sextant when the sun is aligned with the direction of the course, either in the morning or in the evening. The sub-solar spot of the sun at the time when the co-altitude is obtained is obtainable from the American Nautical Almanac. The vane 32 and the carriage mounted thereon are then adjusted to correspond with the Greenwich hour angle and angle of declination of the sun and the quadrant 42 adjusted to the co-altitude. If the end of the quadrant 42 supported upon vane 32 registers with the end of the quadrant supported upon the vane 30 used in indicating the course, the log reading then is approximately correct. As a matter of fact, it is exactly correct unless the vessel has drifted off of its course a substantial distance. Then, by taking a second reading when the direction of the sun is directly normal or perpendicular to the course, another sextant observation may be made upon the sun. Again, referring to the American Nautical Almanac for the sub-solar spot of the sun at this particular time and setting the vane 32 and the carriage mounted thereon for this particular sub-solar spot and adjusting the quadrant 42 carried on the vane 32 to correspond with the co-altitude of the sun, if the vessel is on its course, the course line set up by the quadrant 42 associated with vane 30 will be tangential to the arc swept out by the end of the quadrant 42 carried on the vane 32. Again, if this observation is made while sailing from New York to London, the reading would probably be taken near noon and the sub-solar spot would be in a generally southwardly direction.

If the arc swept out by the quadrant 42 falls short of touching the indicated course, it is indicative that the vessel has drifted south from the indicated course. The angle of drift may be measured upon the quadrant 42 supported upon the vane 32. If the end of the quadrant intersects the course at two points, or the arc overlaps the course, it is indicative that the vessel has drifted north from the course. Again, the angle may be ascertained by adjusting the quadrant 42 carried by the vane 32. When referring to the end of the quadrant 42, it is not the actual end that is meant, but the effective end, namely, the center of the aperture in the end.

In the event it has been found that the vessel has drifted off of its course, a new course may be determined from the actual position of the vessel to its destination by resetting the quadrant 42 carried by the vane 30, so as to cause it to generate an arc of a great circle from the location of the vessel to its destination.

In the preferred embodiments the worm gear is actuated out of engagement with the gear teeth by means of a pivotally mounted U-shaped member. In the modifications disclosed in Figures 12 to 14 inclusive, a U-shaped member 240 has been shown having the legs seated in a pair of parallel grooves on opposite sides of the support 242, the legs being provided with diagonally disposed slots 244 in which the shaft 246 is seated. The U-shaped member is normally urged to the "out" position by means of a pair of compression springs 250. By actuating the U-shaped member 240 by compressing the springs 250, it can readily be seen that the diagonally disposed slots 244 will actuate the shaft 246 from the full line position shown in Figure 12 to the dotted position shown therein and while being thus actuated, the worm gear is actuated out of engagement with the gear teeth. Whenever the pressure exerted upon the U-shaped member compressing the springs 250 is released, the springs will actuate the U-shaped member outwardly or upwardly, as viewed in Figure 14, thereby causing the worm gear to move into engagement with the gear teeth.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a navigational instrument adapted to find fixes in the polar to equatorial regions, a base, a graduated circular scale including degree numerals reading to 360° and being fixedly mounted upon the base and concentric therewith, a centrally disposed standard fixedly attached to the base and projecting upwardly and vertically from the center of the base, a pair of vanes, means for rotatably supporting the vanes upon the standard, the standard forming the sole support for the vanes, the vanes being supported for free rotation upon the standard through an angle of more than 360°, an arcuate quadrant mounted upon each of said vanes, each of said quadrants having free swinging movement through an angle of more than 360° and over the polar region in any position of the supporting vane, a third vane rotatably mounted upon the standard and having an arcuate portion extending across the top of the standard, and means associated with the vanes for indicating their relative angular positions on the graduated scale.

2. A navigational instrument adapted to find a fix in the polar regions including a base, a cylindrical standard fixedly attached to the base and projecting upwardly and vertically from the base, a graduated circular disc fixedly supported with respect to the base and near thereto, a plurality of vanes, loops integral with the vanes and surrounding the standard for supporting the vanes upon the standard, said standard forming the sole support for the vanes, the vanes being supported for free rotation upon the standard through an angle of more than 360°, the top of the standard being located below the top of the vanes, one of the vanes having an arcuate portion extending across the top of the standard, said vanes being provided with extensions overlying the disc, and means for indicating the angular position of the vanes, said means including a support marginally positioned on the disc and mounted for angular adjustment on the disc, said support having a pair of prongs cooperating to form a slot, said means including a pivotally mounted pointer carried by one of said extensions, said pointer having a projection mounted in the path of the support and adapted to be seated in said slot and actuated thereby so that when the pointer is aligned with the extension the support is then aligned with the vane.

3. A fix finder according to claim 2, wherein the disc is provided with marginally disposed teeth, the teeth registering with graduations on the disc, and wherein the support marginally positioned on the disc includes a worm gear meshing with said teeth.

4. In a navigational instrument adapted to find fixes in the polar to equatorial regions, a base, a graduated circular scale fixedly mounted upon the base and concentric therewith, a centrally disposed standard fixedly attached to the base and projecting upwardly and vertically from the center of the base, a pair of vanes, means for rotatably supporting the vanes upon the standard, the standard forming the sole support for the vanes, the vanes being supported for free rotation upon the standard through an angle of more than 360°, a pair of carriages, one for each of the pair of vanes, each of said carriages being mounted so as to indicate different angles of latitude, arcuate quadrants, one for each of the vanes, adjustable means for mounting said arcuate quadrants upon said carriages, said adjustable means permitting both azimuth and longitudinal adjustment of the quadrants, the adjustment of the azimuth angle of the quadrants taking place through an angle of more than 360° about a radial axis, each of said quadrants having a radially disposed aperture near one end thereof, each of the quadrants having a free swinging movement over the polar region in any position of the supporting vane, locking means for locking the azimuth angular adjustment of the quadrants, the radius of curvature of each quadrant emanating from the point of the radius of curvature of the vanes, a third vane rotatably mounted upon the standard and having an arcuate portion extending across the top of the standard, the third vane having a movable fixture mounted thereon, a locking mechanism for rigidly fixing the third vane with respect to the standard, and means for fixing the alignment when the apertures in the ends of the quadrants are aligned and for fixing the alignment of the aperture in at least one quadrant with the aperture in the fixture, and means associated with the vanes for indicating their relative angular positions on the graduated scale.

5. A navigational instrument used in providing data for use in plotting a course along a great circle from a point of departure to the point of destination of a ship or a plane, said instrument including a base, a graduated circular scale fixedly mounted upon the base and concentric therewith, a centrally disposed standard fixedly attached to the base and projecting upwardly and vertically from the center of the base, a vane, means for rotatably supporting the vane upon the standard for free rotation through an angle of more than 360°, the standard forming the sole support for the vane, a second vane mounted for rotation upon the standard and having an arcuate portion extending across the top of the standard, an apertured fixture adjustably mounted on the second vane, means associated with the vanes for indicating their angular positions on the fixed graduated scale, a carriage movably mounted upon the first mentioned vane, said carriage being mounted so as to indicate different angles of latitude, a quadrant movably mounted upon the carriage, said quadrant having a radially disposed aperture near one end thereof, means for adjustably supporting the quadrant upon said carriage for both azimuth and longitudinal adjustment of the quadrant, the azimuthal adjustment of the quadrant taking place through an angle of more than 360° about a radial axis, means for adjusting the first mentioned vane and the carriage thereon to the point of destination, means associated with the second vane and the fixture thereon for adjusting the vane and the fixture to the point of departure, means for locking the second vane and the fixture thereon in position, means for adjusting the quadrant on the first vane so that the aperture in the end thereof directly overlies the aperture in said fixture, means for fixing said alignment, means for locking the azimuth angular adjustment of the quadrant, means for retracting the quadrant towards the point of destination, means on said quadrant for indicating the distance traveled and the distance yet to be traveled, means on said fixture for indicating the compass bearing at any point on the great circle course as the aperture in the quadrant is retracted towards the point of destination, and means for indicating the latitude and longitude of any point on the course.

References Cited in the file of this patent

UNITED STATES PATENTS

| | | |
|---|---|---|
| 780,225 | Pellehn | Jan. 17, 1905 |
| 943,532 | French et al. | Dec. 14, 1909 |
| 2,064,062 | Hagner | Dec. 15, 1936 |
| 2,519,532 | Zerbee | Aug. 22, 1950 |

FOREIGN PATENTS

| | | |
|---|---|---|
| 946 | Great Britain | Apr. 3, 1866 |
| 543,886 | Great Britain | Mar. 18, 1942 |
| 191,019 | Switzerland | Feb. 17, 1936 |
| 858,116 | France | May 6, 1940 |